United States Patent [19] [11] Patent Number: 5,011,273
Ueyama et al. [45] Date of Patent: Apr. 30, 1991

[54] LENS BARREL OF A ZOOM LENS

[75] Inventors: Masayuki Ueyama; Minoru Kuwana, both of Osaka, Japan

[73] Assignee: Minolta Camera Kabushiki Kaisha, Osaka, Japan

[21] Appl. No.: 336,847

[22] Filed: Apr. 12, 1989

[30] Foreign Application Priority Data

Apr. 13, 1988 [JP] Japan .................................. 63-90543

[51] Int. Cl.⁵ ........................ G02B 15/00; G02B 7/04
[52] U.S. Cl. .................................................... 350/429
[58] Field of Search ................................ 350/423, 429

[56] References Cited

U.S. PATENT DOCUMENTS 4,472,032  9/1984  Kamata et al. ........................ 350/429
4,576,446  5/1986  Kamata ................................. 350/429
4,834,514  5/1989  Atsuta et al. ......................... 350/429

FOREIGN PATENT DOCUMENTS 56-133636  10/1978  Japan .
56-58606    5/1981  Japan .
56-145008  11/1981  Japan .
56-161606  12/1981  Japan .

Primary Examiner—Bruce Y. Arnold
Assistant Examiner—Rebecca D. Gass
Attorney, Agent, or Firm—Price, Gess & Ubell

[57] ABSTRACT

A lens barrel of a zoom lens is comprised of a plurality of lens groups securely held by respective movable lens holders, a stationary cam ring having one or more stationary cam slots, a movable cam ring having one or more movable cam slots and rotatably supported about the stationary cam ring, and one or more pins extending through the stationary cam ring and the movable cam ring for connecting the first and second movable lens holders to move them together at the time of zooming.

9 Claims, 3 Drawing Sheets

LENS BARREL OF A ZOOM LENS

BACKGROUND OF THE INVENTION

1. Field of the Invention

The present invention generally relates to a zoom lens for use in a photographic camera, video camera or the like, and more particularly, to a lens barrel of a zoom lens of the type in which at least two lens groups can move in a linked body at the time of zooming.

2. Description of the Prior Art

FIG. 1 depicts a well known zoom lens having four lens groups, in which the first lens group L1 and the fourth lens group L4 move in a linked body.

Generally speaking, in a zoom lens having four lens groups, the first lens group L1 is greater in outer diameter than other three lens groups L2, L3 and L4. Accordingly, in consideration of the compactness of a lens barrel of the zoom lens, a stationary cam ring 1 fixedly mounted on the camera body and a movable cam ring 2 rotatable about the stationary cam ring 1 are so located behind the first lens group L1 as to encircle the second, third and fourth lens groups L2, L3 and L4. In this kind of zoom lens, it is necessary to connect the first and fourth lens groups L1 and L4 to each other by any suitable means. Conventionally, a lens holder 7 for holding the fourth lens group L4 is extended towards and connected to a lens holder 8 for holding the first lens group L1 through openings formed in lens holders 5 and 6 for holding the second and third lens groups L2 and L3, respectively.

However, extended portions 7' of the lens holder 7 for the fourth lens group L4 are required to pass between the first lens group L1 and the front ends of the stationary cam ring 1 and the movable cam ring 2. Accordingly, the stationary cam ring 1 and the movable cam ring 2 are restricted in length in the direction of the optical axis by the thickness of the extended portions 7' of the lens holder 7. In other words, lens holders 5 and 6 for securely holding the second and third lens groups L2 and L3 are restricted in their traveling length due to the restriction of the length of the stationary cam ring 1 and the movable cam ring 2. This is at a disadvantage when the traveling length of each lens group is relatively large. When a certain large traveling length is needed by all means, it is necessary to render the stationary cam ring 1 and the movable cam ring 2 to be greater in outer diameter than the first lens group L1. This is out of harmony with a compact lens barrel design goal.

SUMMARY OF THE INVENTION

Accordingly, the present invention has been developed with a view to substantially eliminating the above described disadvantage inherent in the prior art lens barrel of a zoom lens, and has for its essential object to provide an improved compact lens barrel in which each lens group can travel sufficiently at the time of zooming with respect to the total length of the lens barrel.

Another important object of the present invention is to provide a lens barrel of the above described type which is simple in construction and stable in functioning, and can be readily manufactured at a low cost.

In accomplishing these and other objects, the lens barrel of the zoom lens according to one preferred embodiment of the present invention is provided with a first lens group, at least one second lens group which can move together with the first lens group, a first cam ring having at least one straight cam slot, a second cam ring having at least one diagonal cam slot and rotatably supported about the first cam ring, a first movable lens holder for holding the first lens group, a second movable lens holder for holding the second lens group, and a connecting means for connecting the first and second movable lens holders via said first and second cam rings.

In such a construction of the lens barrel according to the present invention, the connecting means for connecting the first and second movable lens holders or a space required for mounting the connecting means never restricts the length of the first cam ring and the second cam ring in the direction of the optical axis. Accordingly, the traveling length of the movable lens holders at the time of zooming can be desirably extended without losing the compactness of the lens barrel.

BRIEF DESCRIPTION OF THE DRAWINGS

These and other objects and features of the present invention will become more apparent from the following description taken in conjunction with the preferred embodiment thereof with reference to the accompanying drawings, throughout which like parts are designated by like reference numerals, and wherein.

DETAILED DESCRIPTION OF THE PREFERRED EMBODIMENTS

Figure 1:
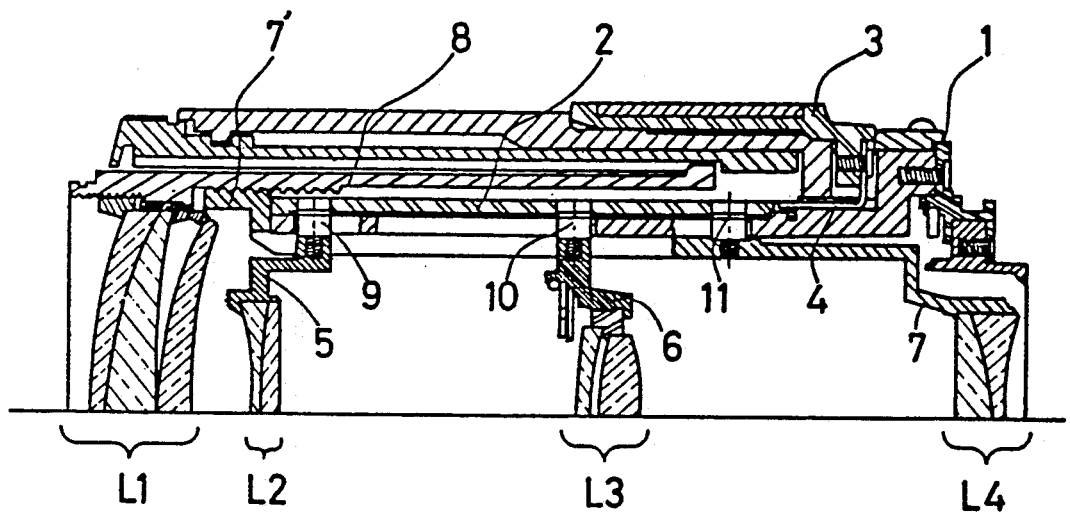
FIG. 1 is a cross-sectional view of a conventional lens barrel of a zoom lens.
Figure 2:
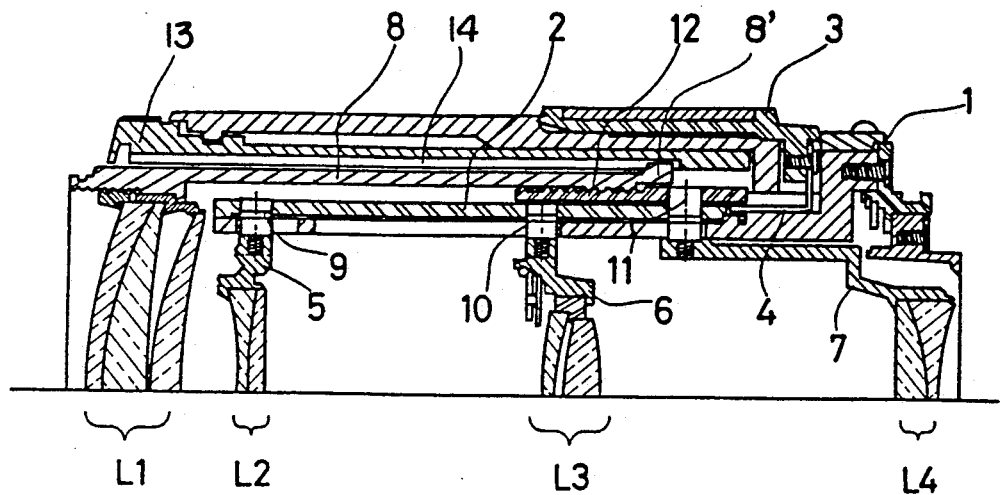
FIG. 2 is a cross-sectional view of a lens barrel of a zoom lens according to one preferred embodiment of the present invention.

Referring now to the drawings, there is shown in FIG. 2 a lens barrel of a zoom lens equipped with four lens groups according to one preferred embodiment of the present invention. In the present invention, the first and fourth lens groups L1 and L4 move in a linked body at the time of zooming. The zoom lens is comprised of a stationary cam ring 1 fixedly mounted on the camera body, a movable cam ring 2 rotatably connected relative to the stationary cam ring 1 and a plurality of lens groups L1, L2, L3 and L4 securely held by respective movable lens holders 8, 5, 6 and 7. A plurality of straight cam slots (hereinafter referred to as stationary cam slots) are formed in the stationary cam ring 1. The movable cam ring 2 cannot move in the direction of the optical axis and is held on the camera body to be freely rotatable within a predetermined angle with respect to the stationary cam ring 1. A plurality of diagonal cam slots (hereinafter referred to as movable cam slots) are formed in the movable cam ring 2.

Each of the lens holders 5, 6 and 7 for securely holding respective lens groups L2, L3 and L4 is supported by one or preferably a plurality of pins 9, 10 or 11 which can move along with intersections between the stationary cam slots of the stationary cam ring 1 and the movable cam slots of the movable cam ring 2. Although these pins 9, 10 and 11, illustrated in FIG. 2, appear to move on the same straight line, they deviate from one another for prevention of mutual overlap. In this embodiment, the movable lens holders 5, 6 and 7 are securely held by three respective pins disposed at the regular intervals of 120° along the entire circumference of the stationary cam ring 1 and the movable cam ring 2.

The pins 11 for supporting the lens holder 7 for the fourth lens group L4 are rigidly secured to a helicoid ring 12, which is connected to the lens holder 8 for holding the first lens group L1 via a helicoid formed on the periphery thereof. Accordingly, since the first and fourth lens groups L1 and L4 are connected to each other via the pins 11 and the helicoid ring 12, they can move in a linked body at the time of zooming. It is, therefore, sufficient for the lens holder 7 of the fourth lens group L4 to have a length up to the location where the pins 11 are provided.

Figure 3:
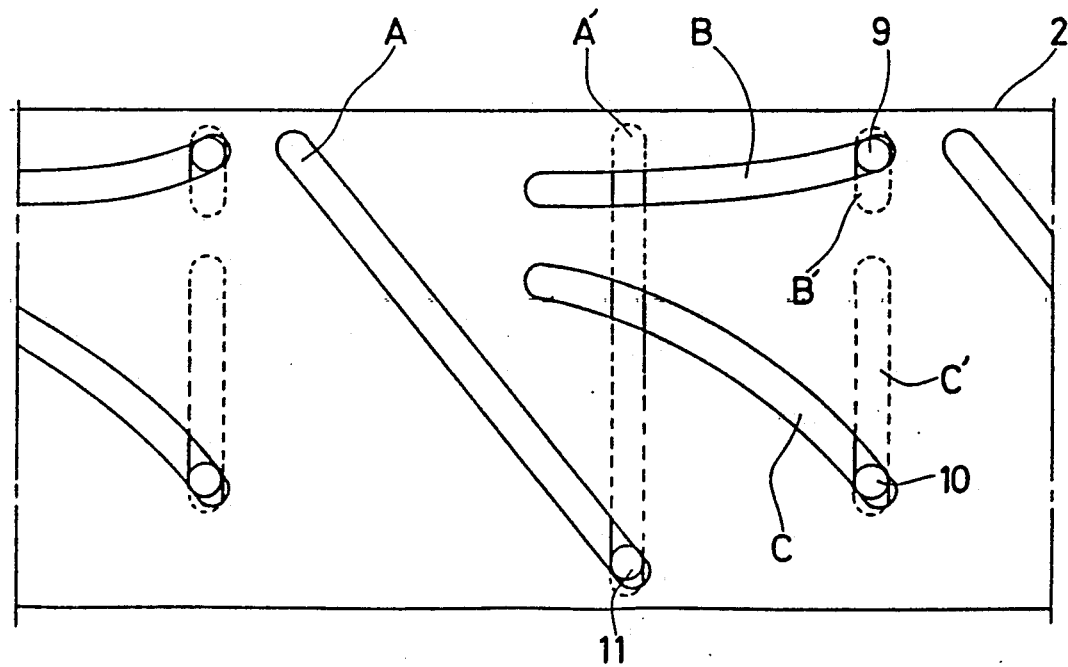
FIG. 3 is a development of a movable cam ring employed in the lens barrel of FIG. 2.

FIG. 3 depicts a development of the movable cam ring 2 according to the embodiment shown in FIG. 2. In this figure, the slots drawn by solid lines represent the movable cam slots A, B and C formed in the movable cam ring 2 whereas those drawn by dotted lines represent the stationary cam slots A', B' and C' formed in the stationary cam ring 1. Both the movable cam slots A and the stationary cam slots A' with which the pins 11 engage are formed for movement of the first and fourth lens groups L1 and L4. Both the movable cam slots B and the stationary cam slots B, with which the pins 9 engage are formed for movement of the second lens group L2. Likewise, both the movable cam slots C and the stationary cam slots C' with which the pins 10 engage are formed for movement of the third lens group L3. It is noted that FIGS. 2 and 4 show the shortest focal length condition of the zoom lens.

The zooming operation is carried out by rotating a zoom ring 3. The rotation of the zoom ring 3 is transmitted to the movable cam ring 2 via a lever 4 which connects the former with the latter. The movable cam ring 2 can rotate about the optical axis with respect to the stationary cam ring 1. Accordingly, the pins 9, 10 and 11, which engage with the movable cam slots A, B and C formed in the movable cam ring 2 and the stationary cam slots A', B' and C' formed in the stationary cam ring 1, move back and forth along the stationary cam slots A', B' and C' by respective predetermined lengths in accordance with the rotational angle of the movable cam ring 2. In this way, each lens group draws its predetermined zooming locus to achieve the zooming operation.

Furthermore, a focusing ring 13 is mounted on the movable lens holder 8 for the first lens group L1 and is provided in the direction of the optical axis with a groove 14 in which a rear projection 8, of the movable lens holder 8 is inserted. Accordingly, upon rotation of the focusing ring 13, the movable lens holder 8 rotates and travels in the direction of the optical axis by virtue of the helicoid formed between the lens holder 8 and the helicoid ring 12. In this way, the focusing operation is done with respect to an object by moving the first lens group L1 back and forth. In this event, since the movable lens holder 7 for the fourth lens group L4 is fixedly connected to the helicoid ring 12, the fourth lens group L4 is kept at a standstill.

Figure 4:
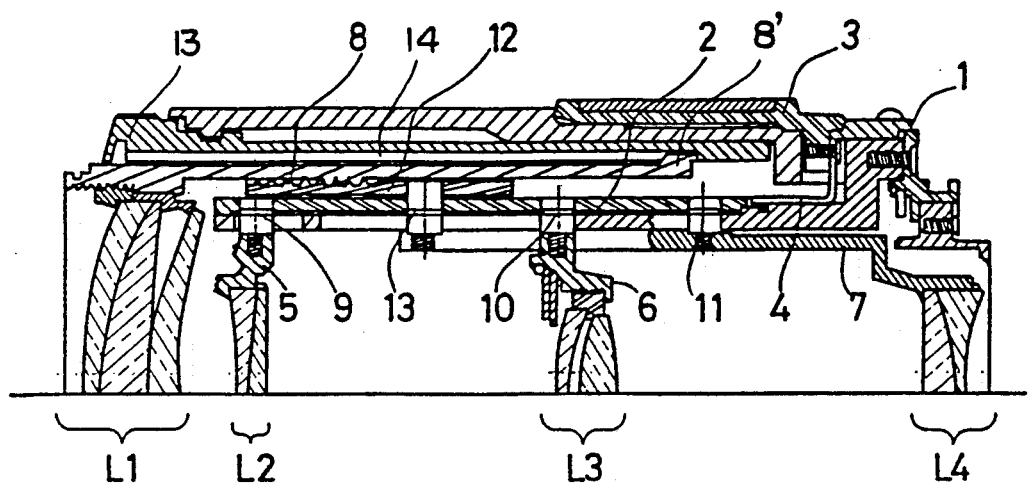
FIG. 4 is a view similar to FIG. 2, according to another embodiment of the present invention.

FIG. 4 depicts the lens barrel of the zoom lens according to another embodiment of the present invention. In the lens barrel of FIG. 4, the movable lens holder 7 for holding the fourth lens group L4 is extended to be connected to the helicoid ring 12 by means of pins 13 in the middle of the stationary cam ring 1 and the movable cam ring 2.

Figure 5:
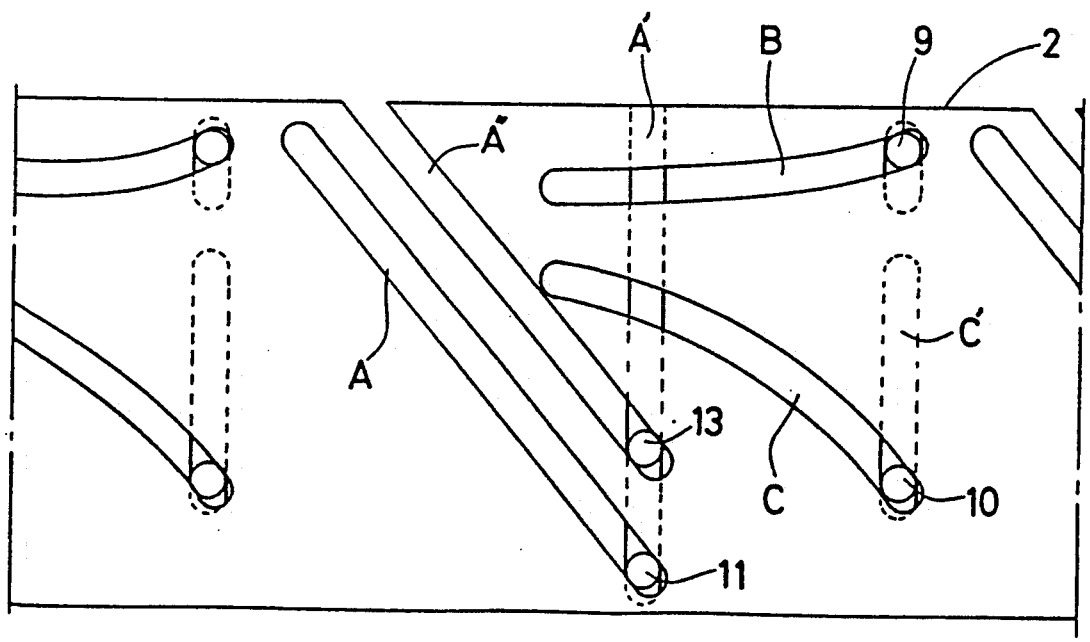
FIG. 5 is a view similar to FIG. 3, of the movable cam ring employed in the lens barrel of FIG. 4.

FIG. 5 depicts a development of the movable cam ring 2 employed in the lens barrel of FIG. 4. As in the aforementioned embodiment, the pins 11 for supporting the movable lens holder 7 can move up to the front end of the movable cam ring 2 upon rotation of the movable cam ring 2 to the right along with the intersections between the movable cam slots A and the stationary cam slots A'.

On the contrary, the pins 13 move along with the intersections between movable cam slots A" parallel to the cam slots A and the stationary cam slots A' and further move out of the breaks of the slots of the stationary cam ring 1 and the movable cam ring 2, until the pins 11 are brought to a stop at the front end of the movable cam slots A. In this condition, if the movable cam ring 2 rotates to the left, the pins 11 move back to the end of the movable cam ring 2 and the pins 13 which have been outside of the cam rings 1 and 3 return to the stationary cam slots A' through, the breaks of the cam rings.

However, the configuration of the movable cam slots A" is not limited by that indicated in FIG. 5 and any configuration may be applicable which allows the pins 13 to move along the stationary cam slots A' and further move out of the breaks of the movable cam ring 2.

In the foregoing embodiments, the stationary cam ring 1 is provided as the stationary cam slots with a plurality of straight slots having a width slightly larger than the diameter of the pins 9, 10 and 11 so that the stationary cam slots can guide the pins 9, 10 and 11 to readily move back and forth on the corresponding straight lines. However, the straight slots may have a width far greater than the diameter of the pins 9, 10 and 11, if the stationary cam ring 1 is provided on its inner side with a plurality of inwardly projecting straight guide members which can guide the lens holders to move back and forth therealong. In this case, a plurality of grooves are formed in each lens holder and engage with the straight guide members.

As is clear from the above, according to the lens barrel of the present invention, a movable lens holder for holding the first lens group is mounted outside a stationary cam ring and a movable cam ring whereas a movable lens holder for holding another lens group which moves together with the first lens group is mounted inside the stationary cam ring and the movable cam ring. Furthermore, since these two lens holders are connected to each other by means of a plurality of pins extending through the stationary cam ring and the movable cam ring, the space required for connecting them never restricts the length of the stationary cam ring and the movable cam ring in the direction of the optical axis.

The lens barrel of the present invention, therefore, can extend the length of travel of several lens groups at the time of zooming without losing compactness of the lens barrel.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A lens barrel for a zoom lens having a first lens group and at least one second lens group the first and second lens groups moving as a linked unit during zooming, said lens barrel comprising:
a stationary cam ring capable of being fixedly mounted on a camera body;
a movable cam ring rotatably supported relative to said stationary cam ring;
a first lens holder for holding said first lens group at a location outside said stationary cam ring and said movable cam ring;
a second lens holder for holding said second lens group at a location inside said stationary cam ring and said movable cam ring; and
a connecting means for connecting said first and second lens holders via said first and second cam rings.

2. The lens barrel according to claim 1, wherein said stationary cam ring has at least one first cam slot, said movable cam ring has at least one second cam slot and said connecting means comprises at least one pin which extends through an intersection between said first and second cam slots, moves along with the intersection and connects said first and second lens holders with each other.

3. The lens barrel according to claim 2, wherein said first cam slot extends along the optical axis of the zoom lens while said second cam slot extends diagonally with respect to the optical axis.

4. The lens barrel according to claim 1, further comprising at least one other lens group which moves at different locus in the first and second lens groups and locates between said first and second lens groups.

5. The lens barrel according to claim 4, wherein said first lens group is positioned at the object side end of the lens barrel.

6. The lens barrel according to claim 5, further comprising a mechanism provided between said first and second lens holders for moving said first lens group relatively to said second lens group for focusing.

7. The lens barrel according to claim 6, wherein said mechanism comprises a helicoid formed at the first lens holder.

8. A lens barrel for a zoom lens having a first lens group and at least one second lens group, with the first and second lens groups moving as a linked body for zooming, said lens barrel comprising:
a stationary cam ring capable of being fixedly mounted on a camera body and having at least one first cam slot;
a movable cam ring having at least one second cam slot and rotatably supported relative to said stationary cam ring;
a first lens holder for holding said first lens group at a location outside said stationary cam ring and said movable cam ring;
a second lens holder for holding said second lens group at a location inside said stationary cam ring and said movable cam ring;
at least one pin which is connected with said second lens holder and moves along with an intersection between said first and second cam slots; and
a connecting means for connecting said first and second lens holders via said first and second cam rings.

9. A lens barrel of a zoom lens having at least two lens groups with the first and second lens groups moving in a linked body for zooming, said lens barrel comprising:
a stationary cam ring fixedly mounted on a camera body and having at least one first cam slot;
a movable cam ring having at least one second cam slot and rotatably supported relative to said stationary cam ring;
a first lens holder for holding said first lens group at a location outside said stationary cam ring and said movable cam ring;
a second lens holder for holding said second lens group at a location inside said stationary cam ring and said movable cam ring; and
at least one pin which connects said first and second lens holders via an intersection between said first and second cam slots and moves along with the intersection.

* * * * *